US010677625B2

(12) United States Patent
Brusilovsky (10) Patent No.: US 10,677,625 B2
(45) Date of Patent: *Jun. 9, 2020

(54) SYSTEM AND METHODS FOR PROVIDING A CLOUD FLOWMETER

(71) Applicant: General Electric Company, Schenectady, NY (US)

(72) Inventor: Michael Brusilovsky, Billerica, MA (US)

(73) Assignee: General Electric Company, Schenectady, NY (US)

( * ) Notice: Subject to any disclaimer, the term of this patent is extended or adjusted under 35 U.S.C. 154(b) by 575 days.

This patent is subject to a terminal disclaimer.

(21) Appl. No.: 15/492,272

(22) Filed: Apr. 20, 2017

(65) Prior Publication Data

US 2017/0219401 A1 Aug. 3, 2017

Related U.S. Application Data

(63) Continuation of application No. 13/746,446, filed on Jan. 22, 2013, now Pat. No. 9,665,536.

(51) Int. Cl.
*G01F 1/66* (2006.01)
*G06F 17/00* (2019.01)
(Continued)

(52) U.S. Cl.
CPC ............. *G01F 1/667* (2013.01); *G01D 4/004* (2013.01); *G01F 1/66* (2013.01); *G01F 15/001* (2013.01);
(Continued)

(58) Field of Classification Search
USPC ......................................................... 702/48
See application file for complete search history.

(56) References Cited

U.S. PATENT DOCUMENTS

2012/0007743 A1* 1/2012 Solomon ............... G01M 3/243
340/605
2012/0232915 A1 9/2012 Bromberger

FOREIGN PATENT DOCUMENTS

CN 101943694 A 1/2011
CN 201828294 A 5/2011
(Continued)

OTHER PUBLICATIONS

International Search Report & Written Opinion issued in connection with corresponding PCT Application No. PCT/US2014/010316 dated Jun. 18, 2014.

(Continued)

*Primary Examiner* — Paul D Lee
(74) *Attorney, Agent, or Firm* — Mintz Levin Cohn Ferris Glovsky and Popeo, P.C.

(57) ABSTRACT

A system and an associated method for monitoring a flowing utility. A transducer, located at a utility flow location, senses data indicative of a utility flow characteristic and outputs a signal conveying the sensed data. A meter device, at the utility flow location, executes at least one program instruction and outputs a signal that conveys at least the sensed data but not a determination of a utility flow characteristic. A remote server, located remote from the utility flow location, receives the signal from the meter device that conveys at least the sensed data but not a determination of the utility flow characteristic, processes the sensed data to determine the utility flow characteristic, processes the sensed data to determine, based at least in part on the sensed data, a program instruction to be executed by the meter device, and transmits a control signal to the meter device.

20 Claims, 3 Drawing Sheets

(51) Int. Cl.
*G01F 15/00* (2006.01)
*G01D 4/00* (2006.01)
*G06F 16/182* (2019.01)
*G01F 15/06* (2006.01)
*G01F 1/00* (2006.01)
*H04L 29/08* (2006.01)

(52) U.S. Cl.
CPC .......... *G01F 15/063* (2013.01); *G01F 15/065* (2013.01); *G06F 16/183* (2019.01); *G06F 17/00* (2013.01); *G01F 1/00* (2013.01); *H04L 67/10* (2013.01)

(56) References Cited

FOREIGN PATENT DOCUMENTS

| | | |
|---|---|---|
| EP | 2527543 A1 | 11/2012 |
| JP | H11-68985 A | 3/1999 |
| JP | 2002-081980 A | 3/2002 |
| JP | 2002-532798 A | 10/2002 |
| JP | 2010-048737 A | 3/2010 |
| JP | 2011-117846 A | 6/2011 |
| WO | 2009052446 A2 | 4/2009 |
| WO | 2012129101 A1 | 9/2012 |
| WO | 2014/020252 A1 | 2/2014 |
| WO | 2014/083340 A1 | 6/2014 |
| WO | 2014/089249 A1 | 6/2014 |

OTHER PUBLICATIONS

Notification of Reasons for Refusal issued in connection with corresponding JP Application No. 2015-553749 dated Jul. 25, 2017.
Office Action issued in connection with corresponding GB Application No. 1513225.1 dated Jan. 23, 2017.
First Office Action and Search issued in connection with corresponding CN Application No. 201480005717.3 dated May 24, 2017.

\* cited by examiner

SYSTEM AND METHODS FOR PROVIDING A CLOUD FLOWMETER

RELATED APPLICATION

The present application is a Continuation application and claims benefit of priority from U.S. patent application Ser. No. 13/746,446, filed Jan. 22, 2013, which is incorporated herein by reference.

FIELD OF THE DISCLOSURE

Embodiments of the disclosure generally relate to meters, and more particularly, to systems and methods for providing a cloud flowmeter.

BACKGROUND

Meters, such as flow meters, are used to measure certain physical characteristics and/or outputs. For example, a flow meter can be used to measure characteristics or output of a fluid flow. Meters, such as flow meters, are typically physically located at the point of measurement, and the data received or otherwise obtained by such meters is usually locally stored.

BRIEF DESCRIPTION

Some or all of the above needs and/or problems may be addressed by certain embodiments of the disclosure. Certain embodiments may include systems and methods for providing a cloud flowmeter.

According to one aspect, system for monitoring a flowing utility is provided. The system includes a transducer, located proximate to the flowing utility at a utility flow location, which senses data indicative of a utility flow characteristic and outputting a sensory signal conveying the sensed data. The system includes a meter device located at the utility flow location and operatively connected to the transducer. The meter device executes at least one program instruction and outputs a signal that conveys at least the sensed data but not a determination of a utility flow characteristic. The system includes a remote server located remote from the utility flow location and the meter device. The remote service receives the signal from the meter device that conveys at least the sensed data but not a determination of the utility flow characteristic, processes the sensed data to determine the utility flow characteristic, processes the sensed data to determine, based at least in part on the sensed data, a program instruction to be executed by the meter device, and transmits a control signal conveying the determined program instruction to the meter device.

According to another aspect, a method for monitoring a flowing utility is provided. The method includes providing a transducer located proximate to the flowing utility at a utility flow location. The method includes sensing data with the transducer that is indicative of a utility flow characteristic and outputting a sensory signal from the transducer conveying the sensed data. The method includes providing a meter device located at the utility flow location and operatively connected to the transducer. The method includes executing at least one program instruction at the meter device and outputting a signal that conveys at least the sensed data but not a determination of a utility flow characteristic. The method includes providing a remote server located remote from the utility flow location and the meter device. The method includes receiving the signal that conveys at least the sensed data but not a determination of the utility flow characteristic from the meter device at the remote server. The method includes processing the sensed data to determine the utility flow characteristic. The method includes processing the sensed data to determine, based at least in part on the sensed data, a program instruction to be executed by the meter device. The method includes transmitting a control signal conveying the determined program instruction to the meter device.

Other embodiments, systems, methods, apparatus aspects, and features of the disclosure will become apparent to those skilled in the art from the following description, the accompanying drawings, and the appended claims.

BRIEF DESCRIPTION OF THE DRAWINGS

The detailed description is set forth with reference to the accompanying drawings, which are not necessarily drawn to scale. The use of the same reference numbers in different figures indicates similar or identical items.

DETAILED DESCRIPTION

Illustrative embodiments of the disclosure will now be described more fully hereinafter with reference to the accompanying drawings, in which some, but not all embodiments of the disclosure are shown. The disclosure may be embodied in many different forms and should not be construed as limited to the embodiments set forth herein; rather, these embodiments are provided so that this disclosure will satisfy applicable legal requirements. As noted above, like numbers refer to like elements throughout.

Illustrative embodiments of the disclosure are directed to, among other things, a cloud flowmeter. As an overview, certain meters, such as an ultrasonic-type flowmeter, can receive signals associated with a fluid flow. One or more transducers associated with the flowmeter can be used to detect, generate, or otherwise measure certain data corresponding to one or more characteristics of the fluid flow. The transducer can transmit the data to the flowmeter, which can generate one or more corresponding signals to be communicated via one or more networks for processing and/or storage. The signals can be used by a server or processing device remote from the flowmeter to generate, for example, a flow measurement, and the flow measurement can be stored in a data storage device and/or processed by a remote server or processing device. Signals can also be used to generate other flow characteristics, meter characteristics, and/or data characteristics, which can include, but are not limited to, real time measurements, instrument logging data, instrument error data, instrument configuration data, meter configuration data, diagnostic data, historical measurement data, etc. In certain embodiments, the flow characteristics, meter characteristics, and/or data characteristics can be transmitted to one or more application programs and/or services, which can access and utilize some or all of the data, signals, and/or flow measurements. In certain embodiments, one or more control actions and/or flowmeter control actions can be determined and implemented based at least in part on some or all of the signals or flow measurements.

Technical effects of certain embodiments of the disclosure may include decreasing the costs of manufacturing and maintaining meters located in the field. Further technical effects of certain embodiments of the disclosure may include faster and less expensive updates of services and/or application programs offered in conjunction with utilizing some or all of the signals or flow measurements. Further technical effects of certain embodiments of the disclosure may include increased use of and widespread use of data received by or otherwise obtained by installed meters.

Figure 1:
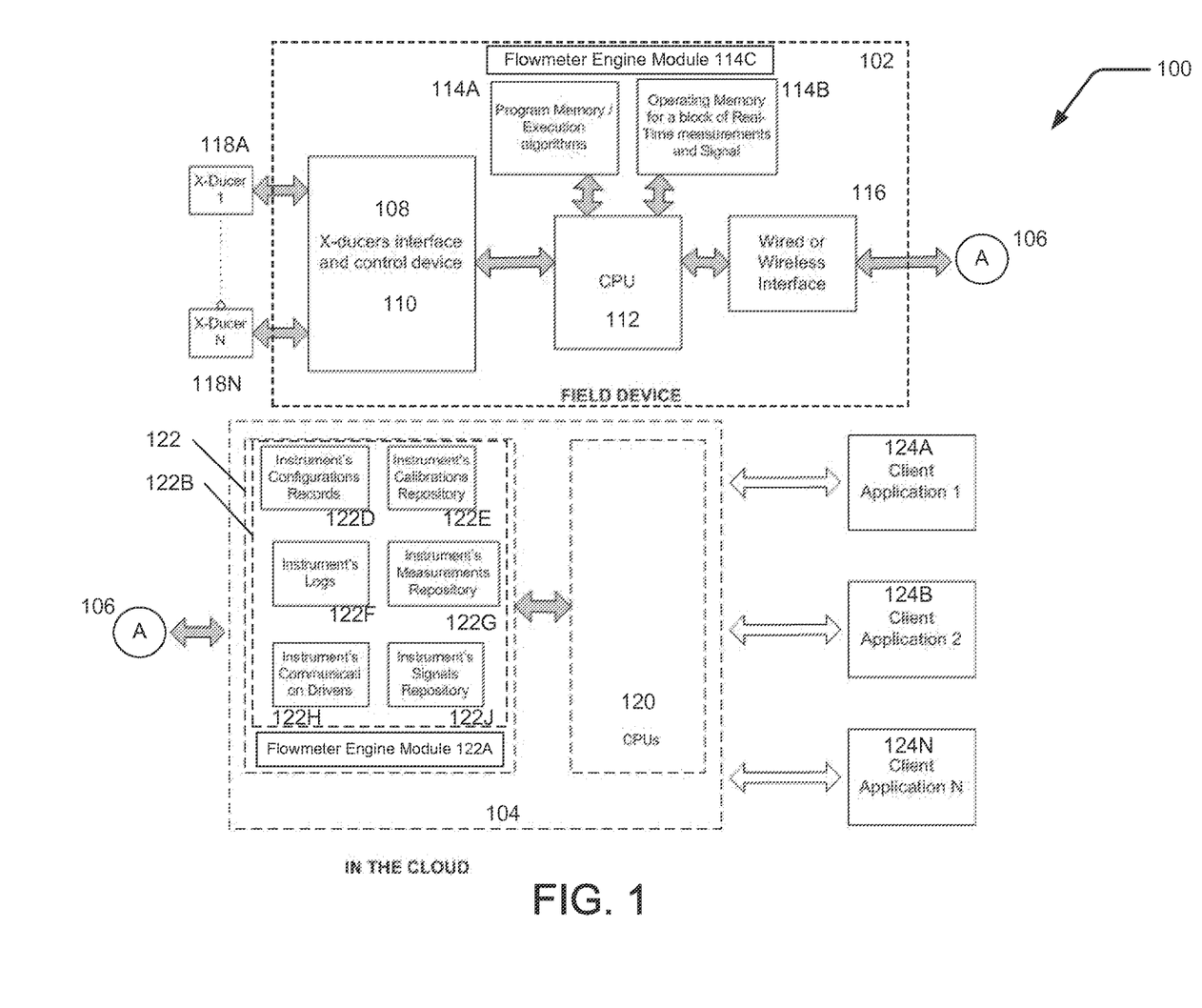
FIG. 1 is a block diagram of an environment showing an illustrative system or cloud flowmeter according to an embodiment of the disclosure.

FIG. 1 illustrates an example environment or system 100 for a cloud flowmeter or apparatus 102 according to an embodiment of the disclosure. The cloud flowmeter or apparatus 102 can be in communication with one or more servers 104 via at least one network 106, which is shown as a single block in FIG. 1 but can represent one or multiple networks. The apparatus 102 can be located at or otherwise associated with a premises or an installation, while the one or more servers 104 can be located at or otherwise associated with a utility service, such as a utility company, a utility provider, or an entity, delegate, or person that monitors, controls, administers, or provides a utility or utility service monitored by the apparatus 102.

The cloud flowmeter or apparatus 102 shown in FIG. 1 can include one or more transducer interfaces 108, a control device 110, a processor 112, one or more memory devices 114, and a communications interface 116. The one or more transducer interfaces 108 can be operable to communicate with one or more respective transducers 118A-118N, sensors, or other data measuring devices to receive or otherwise obtain data and/or signals from the respective transducers 118A-118N. In certain embodiments, the transducers 118A-118N can generate signals corresponding to a flow characteristic or meter characteristic associated with an amount of at least one utility being consumed, used, output, or otherwise being provided to a premises or installation. In certain embodiments, the transducers 118A-118N can measure an amount of at least one utility being consumed, used, output, or otherwise being provided to a premises or installation. A utility can include, but is not limited to, power, natural gas, water, data, sewer, fluid, gas, or any other measurable item or service provided by or regulated by a utility provider or utility service.

The control device 110 can interact with the one or more transducer interfaces 108 as needed to communicate signals and/or data collected or received from the one or more transducers 118A-118N to the processor 112, or otherwise transmit instructions from the processor 112 to the one or more transducer interfaces 108 and/or transducers 118A-118N. In certain embodiments, the control device 110 can receive one or more control signals from the processor 112 and/or a remote processor, such as 120.

The processor 112 can be in communication with the one or more memory devices 114. The processor 112 may be implemented as appropriate in hardware, software, firmware, or combinations thereof. Software or firmware implementations of the processor 112 may include computer-executable or machine-executable instructions written in any suitable programming language to perform the various functions described. In the embodiment shown in FIG. 1, the processor 112 can receive the data and/or signals from the respective transducers 118A-118N and transducer interfaces 108, and the processor 112 can generate corresponding delta T, signals, signal files, and/or other parameters. The corresponding delta T, signals, signal files, and/or other parameters may be transmitted by encryption (with a time stamp and transducer ID) or unencrypted to a remote server or processor, such as server 104 or processor 120.

The one or more memory devices 114 may store program instructions that are loadable and executable on the processor 112, as well as data generated during the execution of these programs. Depending on the configuration and type of environment or system 100, the one or more memory devices 114 may be volatile (such as random access memory (RAM)) and/or non-volatile (such as read-only memory (ROM), flash memory, etc.).

In one use example, one or more transducers 118A-118N can be mounted to a pipe through which a fluid flows. The transducers 118A-118N can detect or otherwise fluid flow parameters within the pipe, and the transducer interfaces 108 can receive one or more corresponding data and/or signals generated or otherwise transmitted by the transducers 118A-118N. The transducer interfaces 108 and/or control device 110 can communicate the corresponding data and/or signals to the processor 112 and/or memory storage devices 114 as needed. The processor 112 can receive the data and/or signals from the transducer interfaces 108, and the processor 112 can generate corresponding delta T, signals, signal files, and/or other parameters, and transmit encrypted or unencrypted delta T, signals, signal files, and/or other parameters to a remote server 104 or processor 120.

The communications interface 116 shown in FIG. 1 can be a device operable to facilitate communications between the processor 112 associated with the apparatus 102, and one or more remotely located processors, such as a processor 120 associated with the one or more servers 104. In some embodiments, the communications interface 116 can be operable to facilitate communications between the processor 112 associated with the apparatus 102, and a utility service, or a processor associated with the utility service. In other embodiments, the communications interface 116 can be operable to facilitate communications between the processor 112 associated with the apparatus 102, and stored database, another computing device or server, user terminals, and/or other devices on the network 106. In certain embodiments, a communication interface 106 can facilitate communications via at least one radio frequency. In certain embodiments, a communications interface 116 can facilitate communications via wired and/or wireless communications. In any instance, a communications interface 116 can facilitate or otherwise provide communications between at least two processors, or between the processor 112 and a utility service.

The one or more servers 104 may each be a computing device, such as a personal computer (PC), handheld or tablet computer, or other processor-based device, remotely located away from the cloud flowmeter or apparatus 102. The one or more servers 104 can include a respective processor 120, which can be in communication with one or more respective memory devices 122, and remotely located away from the cloud flowmeter or apparatus 102. Similar to the processor 112 associated with the apparatus 102, each processor 120 associated with the one or more servers 104 may be implemented as appropriate in hardware, software, firmware, or combinations thereof. Software or firmware implementations of the processors 120 associated with the one or more servers 104 may include computer-executable or machine-executable instructions written in any suitable programming language to perform the various functions described.

The one or more memory devices 122 associated with the respective servers 104 may include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the one or more memory devices 114, 122 of the apparatus 102 and the one or more servers 104 may include multiple different types of memory, such as static random access memory (SRAM), dynamic random access memory (DRAM), or ROM.

The one or more memory devices 114, 120 respectively associated with the apparatus 102 and the server 104, the removable storage, and non-removable storage are all examples of non-transitory computer-readable storage media. For example, non-transitory computer-readable storage media may include volatile and non-volatile, removable and non-removable media implemented in any method or technology for storage of information such as computer-readable instructions, data structures, program modules or other data. The one or more memory devices 114, 120 associated with the apparatus 102 and the servers 104, the removable storage, and non-removable storage are all examples of non-transitory computer storage media. Additional types of non-transitory computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tapes, magnetic disk storage or other magnetic storage devices, or any other medium which can be used to store the desired information and which can accessed by the server or other computing device. Combinations of any of the above should also be included within the scope of computer-readable media.

However, in other embodiments, computer-readable communication media may include computer-readable instructions, program modules, or other data transmitted within a data signal, such as a carrier wave, or other transmission. However, as used herein, computer-readable storage media does not include computer-readable communication media.

As shown in FIG. 1, one or more client applications 124A-124N or client devices can be in communication with the one or more servers 104. Each of the client applications 124A-124N or client devices may be associated with a respective processor, which may in turn be associated with a utility provider or other service provider. Furthermore, each of the client applications 124A-124N or client devices may operate or otherwise communicate via at least one data protocol, such as a Modbus/TCP, Backnet/IP, or other protocol.

As mentioned above, FIG. 1 provides an example environment or system 100 for the cloud flowmeter or apparatus 102 of FIG. 1. The example environment or system 100 may be configured to be a networked computer environment or system, or distributed computer environment or system. While only a single apparatus 102 is shown in FIG. 1, one will recognize that multiple apparatus, similar to 102, or cloud flowmeters, can be in communication with the one or more servers 104 and/or a utility service by way of a communications network, such as 106. Each of the apparatus, such as 102, or cloud flowmeters can be associated with a respective premises or installation.

The cloud flowmeter or apparatus 102 and/or one or more servers 104 may also include one or more input devices, such as a keyboard, mouse, pen, gesture or voice input device, touch input device, etc., and one or more output devices, such as a display, speakers, printer, etc.

Turning to the contents of the one or more memory devices 114 associated with the cloud flowmeter or apparatus 102 in more detail, the one or more memory devices 114 may include an operating system and one or more application programs or services for implementing the features and aspects disclosed herein, including a program memory operable to store one or more execution algorithms 114A, an operating memory 114B operable to store any number of real-time measurements and signals, and a flowmeter engine module 114C or application program. The flowmeter engine module 114C may include one or more computer-executable instructions operable to receive, from a meter device, at least one flow characteristic or meter characteristic via at least one network. The flowmeter engine module 114C may also include one or more computer-executable instructions operable to store the at least one flow characteristic or meter characteristic in a data storage device remote from the meter device.

Turning to the contents of the one or more memory devices 122 associated with the respective one or more servers 104, the one or more memory devices 122 may include an operating system and one or more application programs or services for implementing the features and aspects disclosed herein, including a program memory operable to store one or more execution algorithms, such as a flowmeter engine module 122A or application program, and an operating memory 122B operable to store any number of real-time measurements and signals.

In certain embodiments, the flowmeter engine module 122A may include one or more computer-executable instructions operable to receive, from a meter device, at least one flow signal via at least one network. For example, one or more flow signals can be generated by one or more transducers 118A-118N and/or respective transducer interfaces 108 in response to detecting or otherwise receiving fluid flow parameters within a pipe. The one or more flow signals can be transmitted via at least one network 106 to the flowmeter engine module 122A and/or processor located remote from a cloud flowmeter or apparatus 102.

The flowmeter engine module 122A may also include one or more computer-executable instructions operable to determine, based in part on the at least one flow signal, at least one flow characteristic, data characteristic, or meter characteristic. For example, one or more flow signals received by the flowmeter engine module 122A and/or processor located remote from a cloud flowmeter or apparatus 102 can be used to determine at least one flow characteristic, such as volumetric flow, speed, sound speed, etc., data characteristic, such as log data and diagnostic data; or meter characteristic, such as meter error data, meter configuration data, etc. As needed, the flowmeter engine module 122A can adjust or modify a flow characteristic, data characteristic, or meter characteristic using one or more calibration coefficients and/or other parameters stored at the one or more memory devices 122 or otherwise accessible by the flowmeter engine module 122A and/or the one or more servers 104.

The flowmeter engine module 122A may also include one or more computer-executable instructions operable to store the at least one flow characteristic, data characteristic, or meter characteristic in a data storage device remote from the meter device. For example, at least one flow characteristic, data characteristic, or meter characteristic can be stored by the flowmeter engine module 122A in a data storage device, such as 122, for subsequent processing and/or retrieval. In addition, as needed, any adjusted or modified flow characteristics, data characteristics, or meter characteristics can also be stored by the flowmeter engine module 122A. In any instance, the flow characteristics, data characteristics, or meter characteristics can be converted to and stored by the flowmeter engine module 122A in one or more suitable data protocols, such as a Modbus/TCP or Backnet/IP protocol.

The flowmeter engine module 122A may also include one or more computer-executable instructions operable to transmit the at least one flow characteristic, data characteristic, or meter characteristic to one or more client applications 124A-124N or client devices in communication with the flowmeter engine module 122A and/or the one or more servers 104. In addition, as needed, any adjusted or modified flow characteristics, data characteristics, or meter characteristics can also be transmitted by the flowmeter engine module 122A to one or more client applications 124A-124N or client devices in communication with the flowmeter engine module 122A and/or the one or more servers 104.

In addition, the flowmeter engine module 122A may also include one or more computer-executable instructions operable to optionally determine, based at least in part on the at least one flow characteristic, data characteristic, or meter characteristic, at least one meter control action at a processor remote from the meter device. For example, a meter control action, such as controlling a valve, can be determined by the flowmeter engine module 122A, based at least in part on the at least one flow characteristic, data characteristic, or meter characteristic.

Furthermore, the flowmeter engine module 122A may also include one or more computer-executable instructions operable to optionally generate, based at least in part on the at least one flow characteristic, data characteristic, or meter characteristic, at least one control signal, and transmit the at least one control signal via at least one network. For example, based at least in part on the at least one flow characteristic, data characteristic, or meter characteristic, the flowmeter engine module 122A can generate and transmit at least one control signal to a control device, such as 110.

In some embodiments, the flowmeter engine module 122A can communicate or otherwise interact with any number of processors and/or other flowmeter engine modules, such as 114C, to facilitate or otherwise execute some or all of the foregoing computer-executable instructions or operations described above.

In the embodiment shown in FIG. 1, the one or more memory devices 122 associated with the respective servers 104 can include certain data, such as instrument configuration records 122C, instrument calibrations 122D, instrument logs 122E, instrument measurements 122F, instrument communication drivers 122G, and instrument signal data 122H. In certain embodiments, one or more instrument communication drivers 122G can include one or more computer-executable instructions operable to convert or otherwise pack previously generated or obtained measurements into at least one protocol envelope prior to transmitting the measurements to at least one client application, such as 124A-124N. Thus, for example, if a particular client application, such as 124A, uses Modbus/TCP protocol, or another specific protocol, after a previously generated or obtained measurement, such as volumetric flow, is calculated by the flowmeter engine module, such as 122A, one or more instrument communication drivers 122G can be used to convert or otherwise pack the measurement into a Modbus/TCP protocol envelope, and the data envelope can be transmitted to the desired client application 124A. In this manner, each client application 124A-124N may use different communication and/or data protocols, and the data conversion to these protocols can be implemented via the instrument communication drivers 122G or otherwise remotely from the client applications 124A-124N.

While the embodiment shown in FIG. 1 describes a server 104 with various modules 122A, 122B and functionality apart from the flowmeter or apparatus 102, one will recognize that certain functionality associated with the server 104 can be distributed to any number and combination of servers, processor-based devices, or utility service providers in accordance with other embodiments of the disclosure.

Various instructions, methods, and techniques described herein may be considered in the general context of computer-executable instructions, such as program modules, executed by one or more computers or other devices. Generally, program modules include routines, programs, objects, components, data structures, etc., for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on some form of computer-readable storage media.

The example apparatus 102 and server 104 shown in FIG. 1 are provided by way of example only. Numerous other apparatus, utility meters, servers, operating environments, system architectures, and device configurations are possible. Accordingly, embodiments of the disclosure should not be construed as being limited to any particular apparatus, utility meter, server, operating environment, system architecture, or device configuration.

Figure 2:
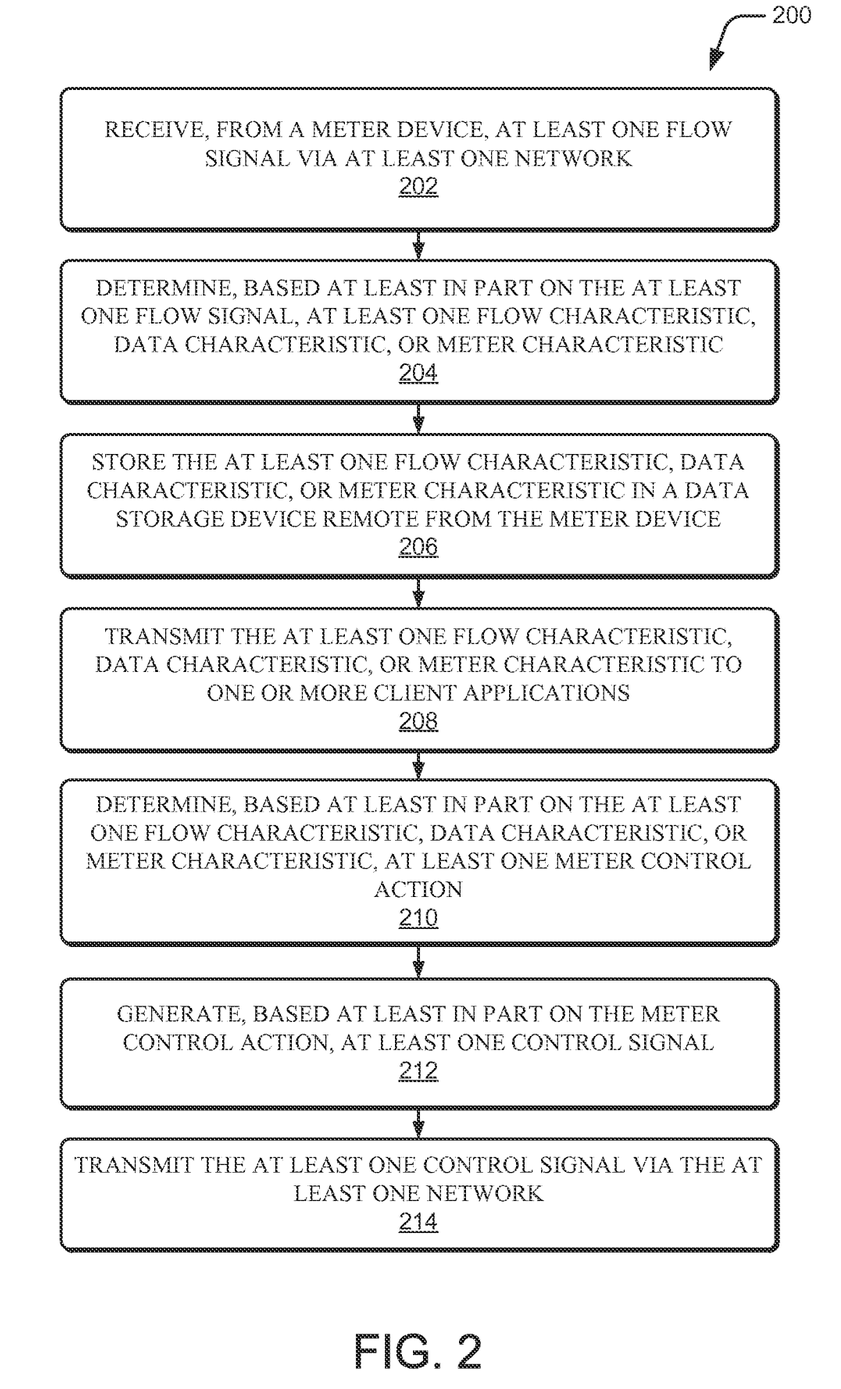
FIG. 2 is a flow diagram illustrating an example method according to an embodiment of the disclosure.

FIG. 2 is a flow diagram of an illustrative process 200 for implementing at least one embodiment of providing a cloud flowmeter, as described with reference to FIG. 1. In one example, the server 104 and/or the flowmeter engine module 122A, or the system 100 may perform any, some, or all of the operations of process 200.

In this particular implementation, the process 200 may begin at block 202 in which the process 200 may receive, from a meter device, at least one flow signal via at least one network. As noted above, one or more transducers, such as 118A-118N in FIG. 1, operating in conjunction with a flowmeter engine module, such as 122A in FIG. 1, can transmit at least one flow signal as observed or received by a meter device 102 in FIG. 1, via at least one network, such as 106 in FIG. 1, to the flowmeter engine module 122A.

Block 202 is followed by block 204, in which based in part on the at least one flow signal, at least one flow characteristic, data characteristic, or meter characteristic is determined. For example, a flowmeter engine module, such as 122A in FIG. 1, and/or processor, such as 120 in FIG. 1, can determine, based in part on the at least one flow signal, at least one flow characteristic, data characteristic, or meter characteristic.

At block 206, the process 200 can store the at least one flow characteristic, data characteristic, or meter characteristic in a data storage device remote from the meter device 102. For example, a flowmeter engine module, such as 122A in FIG. 1, and/or processor, such as 120 in FIG. 1, can store the at least one flow characteristic, data characteristic, or meter characteristic in a data storage device remote from the meter device 102, such as 122B in FIG. 1.

In one aspect of an embodiment, the flowmeter engine module 122A, as needed, can adjust or modify a flow characteristic, data characteristic, or meter characteristic using one or more calibration coefficients and/or other parameters stored at the one or more memory devices 122 or otherwise accessible by the flowmeter engine module 122A and/or the one or more servers 104.

In one aspect of an embodiment, any adjusted or modified flow characteristics, data characteristics, or meter characteristics can also be stored by the flowmeter engine module 122A. In any instance, the flow characteristics, data characteristics, or meter characteristics can be converted to and stored by the flowmeter engine module 122A in one or more suitable data protocols, such as a Modbus/TCP or Backnet/IP protocol.

At block 208, the process 200 can transmit the at least one flow characteristic, data characteristic, or meter characteristic to one or more client applications. For example, a flowmeter engine module, such as 122A in FIG. 1, and/or processor, such as 120 in FIG. 1, can transmit the at least one flow characteristic, data characteristic, or meter characteristic to one or more client applications, such as 124A-124N.

At optional block 210, the process 200 can determine, based at least in part on the one flow characteristic, data characteristic, or meter characteristic, at least one meter control action at a processor remote from the meter device. For example, a flowmeter engine module, such as 122A in FIG. 1, and/or processor, such as 120 in FIG. 1, can determine, based at least in part on the one flow characteristic, data characteristic, or meter characteristic, at least one meter control action.

At optional block 212, the process 200 can generate, based at least in part on the at least one flow characteristic or meter characteristic, at least one control signal. For example, a flowmeter engine module, such as 122A in FIG. 1, and/or processor, such as 120 in FIG. 1, can generate, based at least in part on the at least one flow characteristic, data characteristic, or meter characteristic, at least one control signal, which corresponds to the at least one meter control action.

After block 212, in optional block 214, the process 200 can transmit the at least one control signal via the at least one network. For example, a flowmeter engine module, such as 122A in FIG. 1, and/or processor, such as 120 in FIG. 1, can transmit the at least one control signal via the at least one network, such as 106, to the meter device 102 and/or a control device 110 associated with the meter device 102.

The process 200 may end after block 210.

Figure 3:
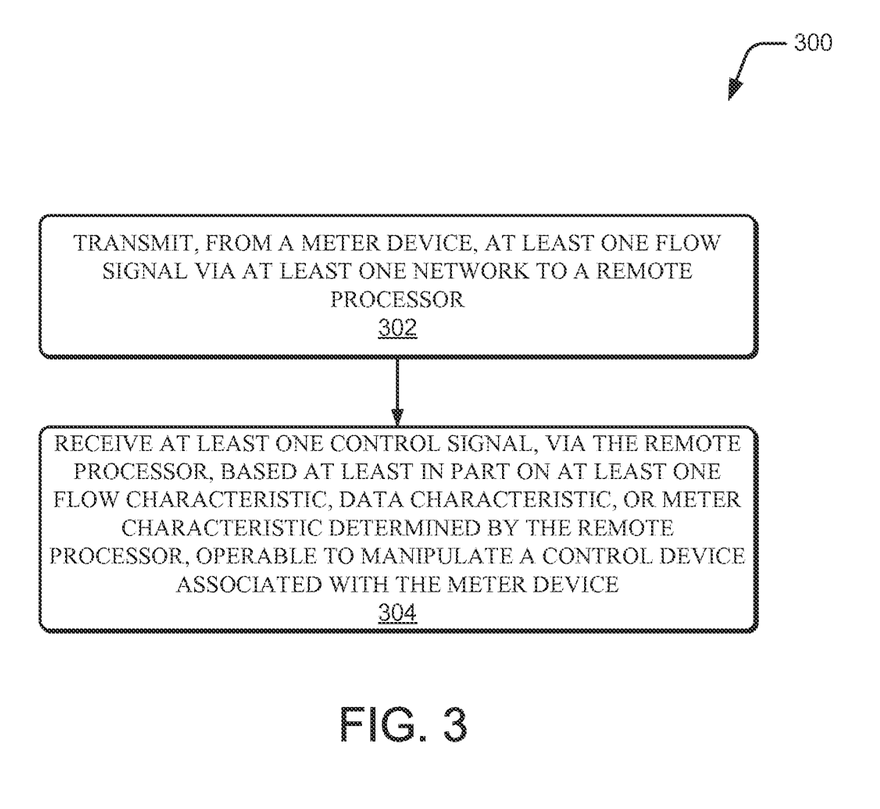
FIG. 3 is a flow diagram illustrating another example method according to an embodiment of the disclosure.

FIG. 3 is a flow diagram of another illustrative process 300 for implementing at least one embodiment of providing a cloud flowmeter, as described with reference to FIG. 1. In one example, the cloud flowmeter or apparatus 102, or the system 100 may perform any, some, or all of the operations of process 300.

In this particular implementation, the process 300 may begin at block 302 in which the process 300 may transmit, from a meter device, at least one flow signal via at least one network to a remote processor. As noted above, one or more transducers, such as 118A-118N in FIG. 1, operating in conjunction with a flowmeter engine module, such as 114C in FIG. 1, and/or processor 112 in FIG. 1, can transmit at least one flow signal as observed or received by a meter device 102 in FIG. 1, via at least one network, such as 106 in FIG. 1, to the flowmeter engine module 122A and/or processor associated with a server, such as 120 in FIG. 1.

At block 304, the process 300 can optionally receive at least one control signal, via the remote processor, based at least in part on at least one flow characteristic, data characteristic, or meter characteristic determined by the remote processor, operable to manipulate a control device associated with the meter device. For example, a flowmeter engine module, such as 114C in FIG. 1, and/or processor, such as 112 in FIG. 1, can receive at least one control signal, via the remote processor 120 and/or flowmeter engine module 122A, based at least in part on the at least one flow characteristic, data characteristic, or meter characteristic determined by the remote processor 120, operable to manipulate a control device associated with the meter device, such as control device 110 in FIG. 1.

The process 300 may end after block 304.

In other process embodiments, fewer or greater numbers of operations can be implemented.

The above processes 200, 300 are illustrated as logical flow diagrams, in which each operation represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

Illustrative systems and methods of for providing a cloud flowmeter are described above. Some or all of these systems and methods may, but need not, be implemented at least partially by an architecture and processes, such as those shown in FIGS. 1-3. It should be understood that certain acts in the methods need not be performed in the order described, may be rearranged or modified, and/or may be omitted entirely, depending on the circumstances. Also, any of the acts described above with respect to any method may be implemented by any number of processors or other computing devices based on instructions stored on one or more computer-readable storage media.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

What is claimed:

1. A system for monitoring a flowing utility, the system comprising:
    a transducer, located proximate to the flowing utility at a utility flow location, sensing data indicative of a utility flow characteristic and outputting a sensory signal conveying the sensed data;
    a meter device, located at the utility flow location and operatively connected to the transducer, executing at least one program instruction and outputting a signal that conveys at least the sensed data but not a determination of a utility flow characteristic; and
    a remote server, located remote from the utility flow location and the meter device, receiving the signal from the meter device that conveys at least the sensed data but not a determination of the utility flow characteristic, processing the sensed data to determine the utility flow characteristic, processing the sensed data to determine, based at least in part on the sensed data, a program instruction to be executed by the meter device, and transmitting a control signal conveying the determined program instruction to the meter device.

2. The system of claim 1, wherein the utility flow characteristic is one of the following: a real time flow measurement or ultrasonic flow meter data, and the remote server is configured to determine the one of the following: a real time flow measurement or ultrasonic flow meter data.

3. The system of claim 1, wherein the utility flow characteristic is one of the following: meter log data, meter error data, meter diagnostic data, or meter configuration data, and the remote server is configured to determine the one of the following: meter log data, meter error data, meter diagnostic data, or meter configuration data.

4. The system of claim 1, wherein the remote server transmits the utility flow characteristic determined by the remote process to one or more client applications.

5. The system of claim 1, wherein the meter device and the remote server communicate over at least one network.

6. The system of claim 1, wherein the determined program instruction is valve control instruction, and the meter device is configured to provide for valve control.

7. The system of claim 1, wherein the meter device includes a meter device processor configured for execution of program instructions and configured for preparing a signal that conveys at least the sensed data but not a determination of the utility flow characteristic.

8. The system of claim 7, wherein the meter device includes a memory, operatively connected to the meter device processor, configured for storing program instructions executable on the meter device processor and storing data generated during the execution of the program instructions.

9. The system of claim 7, wherein the meter device includes a transducer interface and control device, operatively connected to the transducer and the meter device processor, configured for communication exchange between the meter device and the transducer, the communication exchange including receiving the outputted sensory signal conveying the sensed data from the transducer, and configured to provide controlling instructions to the transducer.

10. The system of claim 7, wherein the meter device includes at least one of a wired or wireless interface, operatively connected to the meter device processor, for communicating over at least one network.

11. The system of claim 1, including plural transducers operatively connected to the meter device.

12. The system of claim 1, wherein the meter device is configured to output a signal that conveys a characteristic other than the utility flow characteristic.

13. The system of claim 12, wherein the remote server transmits the characteristic other than the utility flow characteristic to one or more client applications.

14. The system of claim 1, wherein the meter device is further configured for generating signal files for transmission to the remote server, and the remote server is further configured to operate upon the signal files.

15. The system of claim 14, wherein the meter device and the remote server are further configured for the signal files to be encrypted.

16. A method for monitoring a flowing utility, the method comprising:
    providing a transducer located proximate to the flowing utility at a utility flow location;
    sensing data with the transducer that is indicative of a utility flow characteristic and outputting a sensory signal from the transducer conveying the sensed data;
    providing a meter device located at the utility flow location and operatively connected to the transducer;
    executing at least one program instruction at the meter device and outputting a signal that conveys at least the sensed data but not a determination of a utility flow characteristic;
    providing a remote server located remote from the utility flow location and the meter device;
    receiving the signal that conveys at least the sensed data but not a determination of the utility flow characteristic from the meter device at the remote server;
    processing the sensed data to determine the utility flow characteristic;
    processing the sensed data to determine, based at least in part on the sensed data, a program instruction to be executed by the meter device; and
    transmitting a control signal conveying the determined program instruction to the meter device.

17. The method of claim 16, including communicating over at least one network between the meter device and the remote server.

18. The method of claim 16, including transmitting from the remote server to one or more client applications the utility flow characteristic determined by the remote process.

19. The method of claim 16, including the meter device outputting a signal that conveys a characteristic other than the utility flow characteristic.

20. The method of claim 16, including the meter device generating signal files for transmission to the remote server, and the remote server operating upon the signal files.

* * * * *